(12) United States Patent
Millner

(10) Patent No.: US 8,821,760 B2
(45) Date of Patent: Sep. 2, 2014

(54) METHOD AND DEVICE FOR PRODUCING A RAW SYNTHESIS GAS

(75) Inventor: Robert Millner, Loosdorf (AT)

(73) Assignee: Siemens VAI Metals Technologies GmbH (AT)

( * ) Notice: Subject to any disclaimer, the term of this patent is extended or adjusted under 35 U.S.C. 154(b) by 72 days.

(21) Appl. No.: 13/130,628

(22) PCT Filed: Nov. 3, 2009

(86) PCT No.: PCT/EP2009/064494
§ 371 (c)(1),
(2), (4) Date: Aug. 10, 2011

(87) PCT Pub. No.: WO2010/057767
PCT Pub. Date: May 27, 2010

(65) Prior Publication Data
US 2011/0284800 A1      Nov. 24, 2011

(30) Foreign Application Priority Data

Nov. 21, 2008  (AT) ................................. A1822/2008

(51) Int. Cl.
*C01B 3/38*      (2006.01)
(52) U.S. Cl.
USPC ........................................ 252/373; 423/648.1
(58) Field of Classification Search
USPC ............. 252/373; 423/418.2, 648.1, 655, 656
See application file for complete search history.

(56) References Cited

U.S. PATENT DOCUMENTS

| | | | |
|---|---|---|---|
| 3,844,766 A | 10/1974 | Beggs | 75/35 |
| 3,905,806 A | 9/1975 | Cruse | 75/35 |
| 4,062,673 A | 12/1977 | Roberts | 75/40 |
| 4,108,636 A | 8/1978 | Lange | 75/35 |
| 4,160,863 A | 7/1979 | Bouzzard et al. | 544/30 |
| 4,531,973 A | 7/1985 | Nixon | 75/10.41 |
| 4,756,722 A | 7/1988 | Knop | 48/73 |
| 4,852,996 A | 8/1989 | Knop | 48/197 R |
| 5,833,734 A | 11/1998 | Cip | 75/450 |
| 6,569,377 B2 | 5/2003 | Zeller | 266/155 |
| 2007/0060659 A1 | 3/2007 | Kindig | 518/703 |
| 2008/0249196 A1 | 10/2008 | Wentink | 518/702 |

FOREIGN PATENT DOCUMENTS

| | | | |
|---|---|---|---|
| EP | 0200880 A2 | 11/1986 | C01B 3/02 |
| EP | 1939138 A1 | 7/2008 | C01B 3/52 |
| GB | 2076858 A | 4/1980 | C21C 5/28 |
| JP | 60-139790 | 7/1985 | |
| JP | 10-510590 | 10/1998 | |
| RU | 2213787 C2 | 10/2003 | |
| SU | 747402 A3 | 7/1980 | |
| SU | 1584757 A3 | 8/1990 | |
| WO | 97/13878 | 4/1997 | C21B 13/00 |
| WO | 02/30553 A2 | 4/2002 | |

OTHER PUBLICATIONS

International PCT Search Report, PCT/EP2009/064494, 3 pages, Mailed Feb. 24, 2010.
Russian Federation Decision to Grant a Patent of Invention, dated Dec. 16, 2013, issued in corresponding Russian Patent Application No. 2011125340/05(037341) filed Nov. 3, 2009. English Translation. Total 20 pages.

*Primary Examiner* — Edward Johnson
(74) *Attorney, Agent, or Firm* — Ostrolenk Faber LLP

(57) ABSTRACT

A method and an apparatus for generating a gas containing hydrogen ($H_2$) and carbon monoxide (CO), as a raw material for chemical utilization in, for example, synthesis processes based on export gas from a metallurgical process, are shown. Part of the export gas is subjected to CO conversion with the addition of water vapor, crude synthesis gas with a defined quantity ratio of $H_2$ to CO being formed. Even the water vapor required for CO conversion can be at least partially generated in at least one steam generator in the method.

21 Claims, 3 Drawing Sheets

METHOD AND DEVICE FOR PRODUCING A RAW SYNTHESIS GAS

CROSS-REFERENCE TO RELATED APPLICATIONS

This application is a U.S. National Stage Application of International Application No. PCT/EP2009/064494 filed Nov. 3, 2009, which designates the United States of America, and claims priority to Austrian Application No. A1822/2008 filed Nov. 21, 2008, the contents of which are hereby incorporated by reference in their entirety.

TECHNICAL FIELD

The invention relates to a method and an apparatus for generating a gas containing hydrogen ($H_2$) and carbon monoxide (CO), as a raw material for chemical utilization in synthesis processes based on export gas from a metallurgical process, at least part of the export gas being subjected to CO conversion in a transformation reactor, with the addition of water vapor, and crude synthesis gas with a defined quantity ratio of $H_2$ to CO being formed.

BACKGROUND

It is known from the prior art that export gas from metallurgical plants can be delivered for utilization, and in this context, in particular, thermal utilization, such as, for example, combustion, or else the use of the pressure by an expansion turbine may be adopted. Further, after treatment, the export gas may be used, for example, for the direct reduction of oxidic materials.

In this case, however, the problem arises that the efficiency of thermal utilization is low or that complicated processes are required for treating the export gas or the combustion products.

SUMMARY

According to various embodiments, a method and an apparatus can be provided which allow a chemical utilization of export gas and can consequently make the export gas available as a valuable material and as a raw material for chemical synthesis processes.

According to an embodiment, in a method for generating a gas containing hydrogen and carbon monoxide, as a raw material for chemical utilization in synthesis processes based on export gas from a metallurgical process, at least part of the export gas is subjected to CO conversion in a transformation reactor with the addition of water vapor, and crude synthesis gas with a defined quantity ratio of $H_2$ to CO being formed, wherein water vapor formed in at least one steam generator is delivered to the conversion reactor through the CO conversion of the export gas.

According to a further embodiment, the metallurgical process can be a melt-reduction process which is operated by means of a blast furnace or by means of a melt-down gasifier which works in conjunction with at least one reduction assembly, in particular a reduction shaft or a fluidized bed reactor, iron oxide-containing raw materials, in particular iron ores, pellets or sinter, and aggregates being reduced, so as to form a reduction gas, and subsequently being melted into liquid pig iron. According to a further embodiment, the export gas can be obtained from top gas from a blast furnace or a reduction shaft or from offgas from a fluidized bed reactor or from excess gas from a melt-down gasifier or from mixtures of these gases. According to a further embodiment, the water vapor can be generated in the steam generator by means of the combustion of at least a further part of the export gas and/or by using waste heat from the metallurgical process and/or from CO conversion and/or from the synthesis processes. According to a further embodiment, top gas and/or offgas can be dedusted, in particular dry, and/or purified by means of wet dedusting, if appropriate cooled by means of a waste heat steam generator or a heat exchanger and made available as export gas.

According to a further embodiment, the export gas, before it is fed into the transformation reactor or after it has been discharged from the transformation reactor, can be compressed by means of a compressor, if appropriate after a separation of polyaromatic hydrocarbons from the export gas. According to a further embodiment, the CO conversion may take place, if appropriate after a heating of the export gas, particularly at 300-450° C. According to a further embodiment, the crude synthesis gas can be cooled by means of one or more heat exchangers operated as a preheating assembly and/or by means of a water cooler and/or by means of a waste heat steam generator, in order to set the temperature. According to a further embodiment, the crude synthesis gas can be first cooled and is then delivered to a separation process, in particular an absorption process, preferably physical absorption or chemical absorption or physical/chemical absorption, in which sulfur and $CO_2$ are at least partially, in particular largely completely, separated from the crude synthesis gas. According to a further embodiment, the crude synthesis gas treated in the separation process can be heated, in particular, to a temperature of 200 to 400° C. and is desulfurized in a fine desulfurization stage, in particular by means of zinc oxide or activated charcoal. According to a further embodiment, the waste heat occurring during the cooling of the crude synthesis gas in the heat exchanger can be used for heating the crude synthesis gas treated in the separation process. According to a further embodiment, the water vapor occurring during cooling in the waste heat steam generator can be delivered to the transformation reactor for use in CO conversion. According to a further embodiment, the crude synthesis gas treated, in particular in the separation process, can be heated to a temperature of 200 to 450° C. by means of a heat exchanger. According to a further embodiment, the crude synthesis gas can be compressed by means of a compressor, if appropriate before the further fine desulfurization stage and/or before the synthesis process.

According to a further embodiment, the separated sulfur can be separated from the separated $CO_2$ in a sulfur regeneration device, the remaining $CO_2$ being used in the metallurgical process instead of nitrogen, in particular for gas barriers with respect to the atmosphere. According to a further embodiment, the further part of the export gas, before its combustion in the steam generator, can be intermediately stored in a gasholder for the purpose of compensating fluctuations in quantity and/or in calorific value in the export gas. According to a further embodiment, part of the export gas can be locked out for use as fuel gas in other heating devices. According to a further embodiment, the quantity ratio of $H_2$ to CO and/or the pressure and/or the temperature of the crude synthesis gas can be set as a function of the synthesis process in which the crude synthesis gas is processed. According to a further embodiment, at least part of the water vapor formed in the steam generator can be delivered as an energy carrier to the separation process, a thermal expulsion of the $CO_2$ from the absorption liquid used in the separation process taking place. According to a further embodiment, the quantity ratio of $H_2$ to CO in the export gas can be influenced by the addition of water and/or water vapor to the metallurgical process and is consequently adapted to a subsequent synthesis process. According to a further embodiment, tail gas from a $CO_2$ removal device of the metallurgical process can be mixed with the further part of the export gas and is burnt in the steam generator. According to a further embodiment, scavenging gas from the synthesis process can be mixed with the further part of the export gas and is burnt in the steam generator. According to a further embodiment, waste heat from the metallurgical process can be used for the production of water vapor, and the water vapor in this case generated is delivered to the transformation reactor and/or to the separation process. According to a further embodiment, partially oxidized hydrocarbons, in particular natural gas, asphalt, coal or naphtha, can be used in addition to or instead of the export gas.

According to another embodiment, an apparatus for generating a gas containing hydrogen and carbon monoxide, as a raw material for chemical utilization in synthesis processes based on export gas from a metallurgical process, may comprise at least one transformation reactor, at least one steam generator and at least one export gas source, wherein the export gas source is line-connected to the transformation reactor, so that at least part of the export gas can be subjected to CO conversion in the transformation reactor with the addition of water vapor, so as to form a crude synthesis gas with a defined quantity ratio of $H_2$ to CO, and, further, the export gas source is line-connected to the steam generator, so that a further part of the export gas can be at least partially burnt in the steam generator, so as to form water vapor, and the water vapor formed can be delivered to the transformation reactor via a steam line.

According to a further embodiment of the apparatus, a separation device for separating sulfur and $CO_2$ from the crude synthesis gas can be provided, which is connected to the transformation reactor via a crude gas line. According to a further embodiment of the apparatus, a steam line which leads from the steam generator to the separation device can be provided, so that water vapor can be delivered to the separation device. According to a further embodiment of the apparatus, a heat exchanger and/or preheating and/or a water cooler and/or a waste heat steam generator can be provided in the crude gas line for cooling the crude synthesis gas derived from the transformation reactor. According to a further embodiment of the apparatus, a fine desulfurization stage, in particular based on zinc oxide or activated charcoal, can be provided for the separation of residual sulfur from the crude synthesis gas already treated in the separation device.

According to a further embodiment of the apparatus, at least one compressor, in particular a single-stage or multi-stage compressor, for compressing the export gas prior to introduction into the conversion reactor and/or a compressor for compressing the crude synthesis gas prior to introduction into the separation device or into the desulfurization stage can be provided. According to a further embodiment of the apparatus, the separation device can be line-connected to the fine desulfurization stage, this connection leading, if appropriate, through the preheating, so that the crude synthesis gas can be heated before it is introduced into the fine desulfurization stage. According to a further embodiment of the apparatus, a sulfur regeneration device for the regeneration of sulfur from the mixture of sulfur and $CO_2$ which is separated in the separation device can be provided.

According to a further embodiment of the apparatus, the export gas source can be a melt-reduction plant and comprises, in particular, a blast furnace or a melt-down gasifier with at least one reduction assembly. According to a further embodiment of the apparatus, the reduction assembly can be designed as a blast furnace or as a reduction shaft or as a fluidized bed reactor or as at least two fluidized bed reactors connected in series. According to a further embodiment of the apparatus, a gasholder can be provided for the intermediate storage of the further part of the export gas before its combustion in the steam generator, so that fluctuations in quantity and/or in calorific value of the export gas can be compensated. According to a further embodiment of the apparatus, a tar removal device for the removal of polyaromatic hydrocarbons from the export gas can be provided, which is arranged in the connecting line between the export gas source and the transformation reactor.

According to a further embodiment of the apparatus, the waste heat recovery and/or the heat exchanger and/or the preheater can be provided for generating water vapor and are line-connected to the transformation reactor, so that water vapor formed can be delivered to the transformation reactor.

BRIEF DESCRIPTION OF THE DRAWINGS

The invention is explained in more detail below, by way of example, by means of FIGS. 1 and 2.

DETAILED DESCRIPTION

Figure 1:
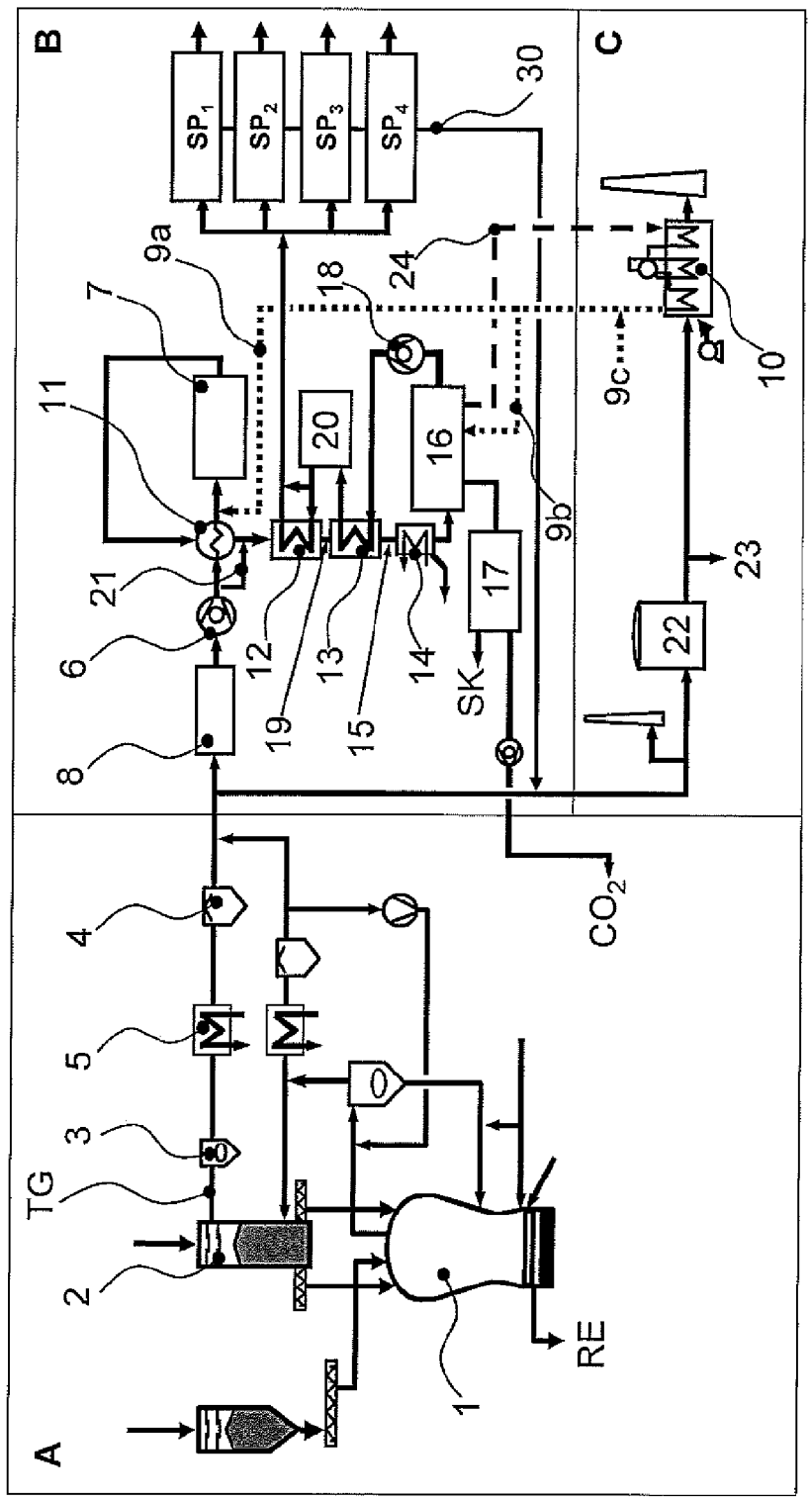
FIG. 1: diagram of the method according to various embodiments based on a melt-reduction plant of the "CORE®" type.

According to various embodiments, the combustibility of the export gas and therefore the energy content, expressed as a calorific value, are used for the generation of water vapor, the water vapor being used for setting the quantity ratio of $H_2$ to CO in the transformation reactor. Even the water vapor necessary for CO conversion can be at least partially generated in at least one steam generator in the method. The export gas from a metallurgical process can to that extent be used for chemical utilization because it has high contents of CO and $H_2$. By means of the directed addition of water vapor, the ratio of CO to $H_2$ can be set in a directed manner under appropriate reaction conditions. For this purpose, the CO conversion principle, known per se, is used, the chemical equilibrium of the water gas reaction between $CO+H_2O$ and $CO_2+H_2$ being influenced.

According to an embodiment, the metallurgical process is a melt-reduction process which is operated by means of a blast furnace or by means of a melt-down gasifier which works in conjunction with at least one reduction assembly, in particular reduction shaft or fluidized bed reactor, iron oxide-containing raw materials, in particular iron ores, pellets or sinter, and aggregates being reduced, so as to form a reduction gas, and subsequently being melted into liquid pig iron.

Melt-reduction processes generate a reduction gas which is used for reducing the batch materials and, here, particularly for the reduction of mostly oxidic ores, such as, for example, iron ores. For this purpose, in the processes, for example, coal or coke is gasified and a reduction gas is formed. The gasification of the coal may take place in a blast furnace or in a melt-down gasifier, in the case of the latter the reduction gas then flowing, if appropriate after purification, into the reduction assembly, and the reduction process proceeding in direct contact with the batch materials. In addition to methods carried out with a single reduction assembly, a plurality of reduction assemblies, such as, for example, a plurality of fluidized bed reactors, connected in series may also be employed. Here, the reduction gas is routed from one fluidized bed reactor to the next opposite to the direction of flow of the batch materials.

According to an embodiment, the export gas is obtained from top gas from a blast furnace or a reduction shaft or from offgas from a fluidized bed reactor or from excess gas from a melt-down gasifier or from mixtures of these gases. Top gas is understood to mean the reduction gas after its direct contact with the batch materials and after the indirect reduction which has in this case taken place. A person skilled in the art designates as offgas the reduction gas which is drawn off from the fluidized bed reactor, in particular from the last of a row of fluidized bed reactors connected in series. On account of the mostly high fractions of CO and $H_2$ in the top gas or in the offgas, this is suitable for use in synthesis processes. Since the reduction gas quantity formed in the melt-down gasifier is not constant in time, excess gas, as it is known, must be added to the export gas. The quantity of excess gas results from the constant reduction gas quantity required in the reduction assembly and from a regulation of the system pressure in a melt-down gasifier.

According to an embodiment, the water vapor is generated in the steam generator by means of the combustion of at least a further part of the export gas and/or by using waste heat from the metallurgical process and/or from CO conversion and/or from the synthesis processes. The water vapor required for CO conversion may be obtained, on the one hand, by means of the combustion of export gas and, on the other hand, by using waste heat. As a result of the at least partial combustion of export gas, considerable savings in the generation of water vapor can be achieved. It is advantageous, further, that, as a result of combustion, toxic fractions in the export gas are broken down. In this case, in particular, use is made of waste heat, for example by means of a heat exchanger, from the metallurgical process, from CO conversion or from the crude synthesis gas formed in this case or from the synthesis processes, so that water vapor generation can take place in a highly energy-efficient way. One or more steam generators may be employed in this case, and where the use of waste heat is concerned these may be designed, for example, as heat exchangers.

Further, there is the possibility of adding preferably hot water to the export gas, before its use in the transformation reactor, in what is known as a saturator, and in this case increasing the water vapor content in the export gas. Advantageously, for this purpose, condensate from the transformation reactor or from the heat exchangers downstream of the transformation reactor may be employed. By means of a saturator being used, the required quantity of added steam can be markedly reduced.

According to a further embodiment, top gas and/or offgas are/is dedusted, in particular dry, and/or purified by means of wet dedusting, if appropriate cooled by means of a waste heat steam generator or a heat exchanger or conditioning device (for example, by the injection of water via two-component nozzles) and made available as export gas. The sensible heat of the export gas can be used by means of heat exchangers, so that a hot or else a largely cold export gas can be made available for CO conversion. In the case of the use of dry-dedusted and therefore hot top gas and/or hot offgas, its sensible heat can be used for the CO conversion, so that no or only slight heating can occur before CO conversion.

According to an embodiment, the export gas, before it is fed into the transformation reactor or after it has been discharged from the transformation reactor, is compressed by means of a compressor, if appropriate after a separation of polyaromatic hydrocarbons from the export gas. As a result of the compression, the pressure is set for CO conversion or for possible subsequent treatments of the crude synthesis gas formed during CO conversion. Compression results in a temperature rise of the compressed gas, this being advantageous in most CO conversion methods, since the already heated gas no longer has to be heated so highly. As a result of the separation of the polyaromatic hydrocarbons, tar constituents are separated from the export gas, so that adverse influences on compression and CO conversion can be avoided.

According to an embodiment, CO conversion takes place, if appropriate after a heating of the export gas, particularly at 300-450° C. Hot CO conversions (for example, using iron/chrome-based or cobalt-based catalysts) affords the advantage that they do not have high sensitivity to sulfur or sulfur compounds, such as, for example, $H_2S$, so that up to 100 ppmv of sulfur can be employed, and, further, are therefore also suitable for the sulfur compounds usually present in export gases.

In contrast to export gas from conventional coal gasification methods by means of a fixed bed, airborne flow or fluidized bed, export gas from melt-reduction methods has the advantage that it has only very low sulfur contents. The sulfur introduced via the raw materials and aggregates is largely desulfurized by means of the aggregates and removed from the iron production process via the slag of the melt-reduction plant. Consequently, the sulfur content in the export gas, mostly bound as $H_2S$ and COS, is markedly lower than in known coal gasification methods. Separate desulfurization therefore does not have to take place before the CO conversion, since the export gas already contains sufficiently small quantities of sulfur, sometimes less than 100 ppmv.

According to an embodiment, the crude synthesis gas is cooled by means of one or more heat exchangers operated as a preheating assembly and/or by means of a water cooler and/or by means of a waste heat steam generator, in order to set the temperature. After CO conversion has taken place, the waste heat of the crude synthesis gas, which is already present in the desired quantity ratio of $H_2$ to CO, can be utilized in conventional heat exchangers or else for generating water vapor.

According to an embodiment, the crude synthesis gas is first cooled and then delivered to a separation process, in particular an absorption process, preferably physical absorption or chemical absorption or physical/chemical absorption, in which sulfur and $CO_2$ are at least partially, in particular largely completely, separated from the crude synthesis gas.

Known physical absorption processes are the Rectisol® or Selexol process, known chemical absorption process are amine scrubbing or the Benfield process, and a known physical/chemical absorption process is the sulfinol process.

For chemical utilization in synthesis processes, such as, for example, ammonia, methanol or methane production or in oxo-alcohol production, it is necessary to set as pure a $CO/H_2$ mixture as possible in a specific $H_2/CO$ ratio. By means of the methods known per se which have been listed, it is possible to separate $CO_2$ and sulfur virtually completely, so that $H_2S$ contents in relation to the volume of up to 1 ppmv can be set. Usually, methods of this type operate at low temperatures, and therefore the gas temperature necessary for the process is set by cooling. Separation processes mostly require compression, in order thereby to set the partial pressures necessary for the separation process, in particular sufficiently high $CO_2$ partial pressure. In a Rectisol process, for example, a minimum $CO_2$ partial pressure of $P_{CO2}=6$ bar is required. For this purpose, the crude synthesis gas is compressed to about 10-35 barg. The term "barg" is understood to mean the relative pressure unit "bar gauge".

According to an embodiment, the crude synthesis gas treated in the separation process, is heated, in particular, to a temperature of 200 to 400° C. and, if appropriate, is desulfurized in a further fine desulfurization stage, in particular by means of zinc oxide or activated charcoal. The additional fine desulfurization stage allows a further reduction of the sulfur content in the crude synthesis gas to a very low residual content of less than 0.02 ppmv $H_2S$, such as are required, for example, for methanol production with <0.1 ppmv. As a result of heating, the method temperature of about 200-400° C., optimal for desulfurization, is set. For example, zinc oxide adsorption methods or activated charcoal methods, etc. may be employed as a fine desulfurization stage.

According to an embodiment, the waste heat occurring during the cooling of the crude synthesis gas in the heat exchanger is used for heating the crude synthesis gas treated in the separation process. By the waste heat being used, an efficient heating of the treated crude synthesis gas can take place.

According to an embodiment, the water vapor occurring during cooling in the waste heat steam generator is delivered to the transformation reactor for use in CO conversion. The energy demand for water vapor generation can consequently be reduced.

According to an embodiment, the crude synthesis gas treated, in particular in the separation process, is heated to a temperature of 200-450° C. by means of a heat exchanger. Advantageously, in this case, use may be made of the heat which has occurred during the cooling of the crude synthesis gas in the heat exchanger prior to its treatment in the separation process. The crude synthesis gas is in this case heated to a temperature necessary for the subsequent synthesis process.

According to an embodiment, the crude synthesis gas is compressed by means of a compressor, if appropriate before the further fine desulfurization stage and/or before the synthesis process. Compression takes place at a pressure level necessary for the respective synthesis method. The heating occurring during the compression of the crude synthesis gas reduces the energy supply necessary for bringing the crude synthesis gas to the process temperatures which are necessary in the fine desulfurization stage and/or in a subsequent synthesis process.

According to an embodiment, the separated sulfur is separated from the separated $CO_2$ in a sulfur regeneration device, the remaining $CO_2$ being capable of being used in the metallurgical process instead of nitrogen, in particular for a gas barriers with respect to the atmosphere. In order to make the $CO_2$ separated from the crude synthesis gas capable of being used unrestrictedly on an industrial scale, it is necessary for this to be desulfurized. In this case, for example, the hydrogen sulfide oxidation method (LO-CAT II) may be employed, in which sulfur is separated as a filter cake. The desulfurized $CO_2$ can then be used in industrial applications, such as, for example, as a gas barrier for sealing off process assemblies with respect to the atmosphere, or else be discharged into the atmosphere.

According to an embodiment, the further part of the export gas, before its combustion in the steam generator, is intermediately stored in a gasholder for the purpose of compensating fluctuations in quantity and/or in calorific value in the export gas. For the steam generator to be operated as uniformly as possible, it is necessary to make available export gas which has a largely constant calorific value and is present in a constant quantity. So that these conditions can be fulfilled, the export gas is intermediately stored in a gasholder, in which case fluctuations in calorific value and in volume can be compensated. By means of a sufficiently large volume of the gasholder, a largely constant supply to the steam generator can be achieved.

According to an embodiment, part of the export gas is locked out for use as fuel gas in other heating devices. Consequently, remaining quantities of export gas which are not used for water vapor generation or for CO conversion can be used, use of the pressure energy also being possible in addition to thermal utilization.

According to an embodiment, the quantity ratio of $H_2$ to CO and/or the pressure and/or the temperature of the crude synthesis gas are/is set as a function of the synthesis process in which the crude synthesis gas is processed. Synthesis processes operate at very different pressures and temperatures and with different quantity ratios of $H_2$ to CO. In this case, for example, methanol production requires a quantity ratio of $H_2$ to CO of 2.0 to 2.3 or, in other words, a ratio $(H_2-CO_2)/(CO+CO_2)$ equal to 2.03, whereas, for example, oxo-alcohol synthesis requires a quantity ratio of 1.0 to 1.2. As a result of the flexibility of the method, it is therefore possible to set the crude synthesis gas exactly to the respective synthesis method.

According to an embodiment, at least part of the water vapor formed in the steam generator is delivered as an energy carrier to the separation process, a thermal expulsion of the absorbed $CO_2$ from the absorption liquid used in the separation process taking place. By the water vapor from the steam generator being used, the separation process can be operated in a highly energy-efficient manner. Thermal expulsion in this case constitutes one possible method for separating the $CO_2$.

According to an embodiment, the quantity ratio of $H_2$ to CO in the export gas is influenced by the addition of water and/or water vapor to the metallurgical process and is consequently adapted to a subsequent synthesis process. By virtue of this measure, it is possible to influence the composition of the export gas, consequently even before CO conversion, in a directed manner. As a result, in particular, $H_2$ and/or water vapor from the metallurgical process can be used, and therefore the export gas composition can be coordinated with the planned chemical utilization.

According to an embodiment, tail gas from a $CO_2$ removal device of the metallurgical process is mixed with the further part of the export gas and is burnt in the steam generator. Further process gases, such as occur in devices for $CO_2$ removal, may therefore also be used for the generation of water vapor.

According to an embodiment, scavenging gas from the synthesis process is mixed with the further part of the export gas and is burnt in the steam generator. Scavenging gas occurs during the recycling of gases in synthesis processes. In the synthesis process, mostly only part of the crude synthesis gas can be reacted, since the thermodynamic equilibrium is then reached. To increase the reaction rate, therefore, a circulatory type of operation is necessary, process water and, for example, methanol being condensed out and being separated. The unreacted synthesis gas is recirculated into the synthesis reactor. In order to avoid an unwanted enrichment with undesirable gas constituents, part has to be locked out of the circuit as scavenging gas which can be utilized thermally together with export gas.

According to an embodiment, waste heat from the metallurgical process is used for the production of water vapor, and the water vapor in this case generated is delivered to the transformation reactor and/or to the separation process. As a result, waste heat from the metallurgical process itself and the water vapor consequently obtained can be used for CO conversion or for a regeneration of the absorption liquid laden with $CO_2$ and used in the separation process, so that a further increase in efficiency can be achieved. The waste heat may be obtained, for example, from hot top gas, offgas or excess gas.

Metallurgical processes mostly require further auxiliary methods which, for example, make process materials available for the metallurgical process. One example is oxygen generation which is usually coupled to metallurgical processes. Waste heat from such auxiliary methods or plants, such as, for example, oxygen generation or else synthesis gas preparation can therefore also be used for steam generation.

According to an embodiment, partially oxidized hydrocarbons, in particular natural gas, asphalt, coal or naphtha, are used in addition to or instead of the export gas. By means of the further gases instead of or in addition to the export gas, a redundant method can be achieved, so that, even in the event of a planned stoppage of the metallurgical process or in the event of faults, the operation of the synthesis process can be maintained.

The apparatus according to various embodiments provides for the export gas source to be line-connected to the transformation reactor, so that at least part of the export gas can be subjected to CO conversion in the transformation reactor with the addition of water vapor. In this case, a crude synthesis gas with a defined quantity ratio of $H_2$ to CO is formed. To generate the water vapor necessary for CO conversion, the export gas source is line-connected to the steam generator, so that a further part of the export gas can be at least partially burnt in the steam generator, so as to form water vapor, and the water vapor formed can be delivered to the transformation reactor via a steam line. Alternatively, it is also conceivable that the transformation reactor can be supplied by means of water vapor from a waste heat recovery plant.

According to a further embodiment of the apparatus, a separation device for separating sulfur and $CO_2$ from the crude synthesis gas is provided, which is connected to the transformation reactor via a crude gas line. The separation device used may comprise devices known per se which are constructed, for example, from an absorption column and a stripper column. Devices of this type may be gathered from the prior art.

According to yet a further embodiment of the apparatus, a steam line which leads from the steam generator or waste heat recovery plant to the separation device is provided, so that water vapor or, alternatively, also energy in the form of a hot gas stream can be delivered to the separation device. The energy necessary for the mostly thermal expulsion of the $CO_2$ can be applied by the supply of water vapor or waste heat, so that no additional energy source is necessary.

According to yet a further embodiment of the apparatus, a heat exchanger and/or preheating and/or a water cooler and/or a waste heat steam generator are or is provided in the crude gas line for cooling the crude synthesis gas derived from the transformation reactor. Cooling is necessary for the further treatment of the crude synthesis gas, the heat discharged in this case being capable of being discharged in a heat exchanger or else of being used for steam generation. Gas/gas heat exchangers or else liquid/gas heat exchangers may in this case be employed, the latter making it possible to have a greater cooling of the synthesis gas.

According to yet a further embodiment of the apparatus, a fine desulfurization stage, in particular based on zinc oxide or activated charcoal, is provided for the separation of residual sulfur from the crude synthesis gas already treated in the separation device. Fine desulfurization stages of this type may take the form zinc oxide adsorption methods or activated charcoal methods which take place in adsorption columns.

According to yet a further embodiment of the apparatus, at least one compressor, in particular a single-stage or multistage compressor, for compressing the export gas prior to introduction into the transformation reactor and/or a compressor for compressing the crude synthesis gas prior to introduction into the separation device or into the desulfurization stage are or is provided. Multistage compressors are employed, above all, when higher compressions are necessary. Compression results in a heating of the compressed gas. One advantage of the division into two compressors is that, after the separation of $CO_2$ and sulfur, only part of the crude synthesis gas (for example, approximately 55% for a methanol production) has to be compressed to the pressure required for the synthesis process, since a large part of the synthesis gas is already separated in the form of $CO_2$ in the separation device (for example, approximately 45% for a methanol production).

According to yet a further embodiment of the apparatus, the separation device is line-connected to the fine desulfurization stage, this connection leading, if appropriate, through a preheating, so that the crude synthesis gas can be heated before it is introduced into the desulfurization stage. By means of the heat exchanger, the crude synthesis gas can be adapted to a temperature optimal for the desulfurization stage and/or the synthesis process, an energy-efficient heating of the gas taking place as a result of the use of the waste heat.

According to yet a further embodiment of the apparatus, a sulfur regeneration device for the regeneration of sulfur from the mixture of sulfur and $CO_2$ which is separated in the separation device is provided. Sulfur is in this case separated as a filter cake, and the separation device may be operated, for example, as a hydrogen sulfide oxidation method (LO-CAT II).

According to yet a further embodiment of the apparatus, the export gas source is a melt-reduction plant and comprises, in particular, a blast furnace or a melt-down gasifier with at least one reduction assembly. Metallurgical assemblies of this type generate export gas in a quantity and quality sufficient for chemical utilization, the method according to various embodiments being employed. Owing to the possibility of setting the composition of the export gas, plants of this type are especially suitable as an export gas source.

According to yet a further embodiment of the apparatus, the reduction assembly is designed as a blast furnace or as a reduction shaft or as a fluidized bed reactor or as at least two fluidized bed reactors connected in series. The reduction gases generated in the reduction assemblies, after being reacted with the batch materials to be reduced, are drawn off from the assemblies. Depending on the method, in this case a CO— and $H_2$-rich gas is obtained which, after dedusting and/or scrubbing, can be used as export gas.

According to yet a further embodiment of the apparatus, a gasholder is provided for the intermediate storage of the further part of the export gas before its combustion in the steam generator, so that fluctuations in quantity and/or in calorific value of the export gas can be compensated. The volume of the gasholder is selected in such a way that, in spite of plant-related fluctuations in the export gas quantity or in its composition, a largely constant supply to the steam generator can be ensured.

According to yet a further embodiment of the apparatus, a tar removal device for the removal of polyaromatic hydrocarbons from the export gas is provided, which is arranged in the connecting line between the export gas source and the transformation reactor. Consequently, unwanted constituents which may have an adverse effect on gas treatment (for example, compression) and chemical utilization can be removed.

According to yet a further embodiment of the apparatus, the waste heat recovery and/or the heat exchanger and/or the preheater are provided for generating water vapor and are line-connected to the transformation reactor, so that water vapor formed can be delivered to the transformation reactor. The waste heat can consequently be used for steam generation. Likewise, the synthesis plants may be provided with waste heat steam generators (for example, in the case of an isothermal process management of the synthesis process), so that waste heat from the synthesis processes can also be used for water vapor generation.

FIG. 1 shows a process diagram and a plant which processes export gas from a metallurgical process or a metallurgical plant, such as, for example, a melt-reduction plant of the "COREX®" type. The plant part A comprises the melt-reduction plant, and the plant part B comprises the plant for producing the crude synthesis gas and the synthesis products, while the plant part C relates to steam generation.

In a melting assembly, such as, for example, a melt-down gasifier 1, pig iron RE from the batch materials reduced in the reduction assembly 2 is melted so as to generate a reduction gas. The reduction gas is introduced into the reduction assembly 2 where, with the reduction gas in direct contact with the batch materials, an at least partial reduction to sponge iron takes place. Further details of the treatment of the reduction gas before its entry into the reduction assembly 2 are not dealt with any further, since this belongs to the prior art and is well known to a person skilled in the art.

After reduction in the reduction assembly 2, the reduction gas is drawn off as top gas TG from the reduction assembly 2 and is delivered at least to dry dedusting 3 or else wet dedusting 4 and purified. It is also possible to combine prepurification in the dry dedusting 3 with subsequent wet dedusting 4. In order to use the sensible heat of the top gas, the top gas may also be delivered to a waste heat recovery 5, such as for example a heat exchanger or a waste heat steam generator, and in this case cooled. The purified and, if appropriate, cooled top gas is made available as export gas to the tank part B. The plant part A serves as the export gas source. In addition to this export gas source, a further identical or different metallurgical plant or else combustion chambers for the partial oxidation of natural gas, steam reformers based on natural gas or airborne flow gasifiers for the gasification of coal may also serve as a gas source. Here, the export gas is first compressed in a compressor 6, a pressure necessary for the transformation reactor 7 or for CO conversion being set. Prior to compression, polyaromatic hydrocarbons can also be separated from the export gas by means of a tar removal device 8. After an optional heating of the compressed export gas in a heat exchanger 11, CO conversion takes place with the addition of steam which is fed to the transformation reactor 7 via the steam line 9 from the steam generator 10, a shift in the quantitative fractions CO and $H_2$ occurring. The reaction can be controlled in a directed manner via the quantity of water vapor added, the temperature and the pressure, the crude synthesis gas being generated.

The crude synthesis gas is first cooled by means of the heat exchangers 11, 12 and the preheating 13, which may also be designed as a heat exchanger, and, if appropriate, by means of a further water cooler 14, these assemblies being arranged in the crude gas line 19. Optionally, the hot crude synthesis gas may be cooled by means of a waste heat steam generator 15 and in this case used for generating water vapor. The cooled crude synthesis gas is then delivered to a separation device 16 for separating sulfur and $CO_2$ from the crude synthesis gas, the separated sulfur and $CO_2$ being delivered to a desulfurization stage 17. Here, the sulfur is separated from the $CO_2$ so as to form a sulfur cake SK. The then virtually sulfur-free $CO_2$ can be used as a process gas in metallurgical processes, such as, for example, in gas barriers, or else be discharged into the atmosphere.

The purified synthesis gas is then fed, after compression in a compressor 18, to the preheating 13, the purified crude synthesis gas, after emerging from the transformation reactor 7, being heated, using the waste heat from the crude synthesis gas. The then heated crude synthesis gas is delivered, if appropriate, to a fine desulfurization stage 20, sulfur or hydrogen sulfide ($H_2S$) being separated in adsorption columns based on a zinc oxide adsorption or activated charcoal method. This adsorption treatment usually takes place at temperatures of about 200 to 400° C. The desulfurized and hot crude synthesis gas may be further heated, as required, by means of the heat exchanger 12, a temperature of about 200 to 450° C., advantageous for subsequent chemical utilization, being set. For regulating purposes, the compressed export gas may be routed past the transformation reactor or the heat exchanger 11 via a bypass line 21.

Both the transformation reactor 7 and the separation device 16 require large quantities of water vapor for operation. For this purpose, the export gas source is also connected to a steam generator 10 via a line. In the steam generator, water vapor is generated by means of the combustion heat of the export gas and is fed via steam lines 9a and 9b to the transformation reactor 7 or the separation device 16. Optionally, the steam lines 9a and 9b may also be supplied via an additional steam line 9c, this relating to water vapor which originates from the waste heat from the metallurgical process, gas treatment or the synthesis process and which has been generated, for example, by means of waste heat steam generators, using hot process media.

The plant part C also comprises in addition to the steam generator 10 a gasholder 22 for the intermediate storage of that part of the export gas which is provided for combustion in the steam generator 10, fluctuations in the quantity and/or in the calorific value of the export gas being capable of being compensated. Should excess export gas be present, this may also be utilized via a discharge line 23 for other purposes, such as, for example, in coal drying plants, nutty slack drying plants or ore drying plants. Condensates formed in the separation device 16 can be recirculated into the steam generator 10 via a condensate line 24.

The purified and heated crude synthesis gas may be used, for example, as raw material for the production of methane, methanol, oxo-alcohols or else Fischer-Tropsch fuels in chemical synthesis processes $SP_1$-$SP_4$, in each case the crude synthesis gas being coordinated with the synthesis process. For this purpose, above all, the quantity ratio of CO to $H_2$ is set in addition to the pressure and temperature.

Scavenging gas from the synthesis process can be mixed with the further part of the export gas via a scavenging gas line 30 and delivered to the gasholder 22 and can subsequently be burnt in a steam generator 10.

Figure 2:
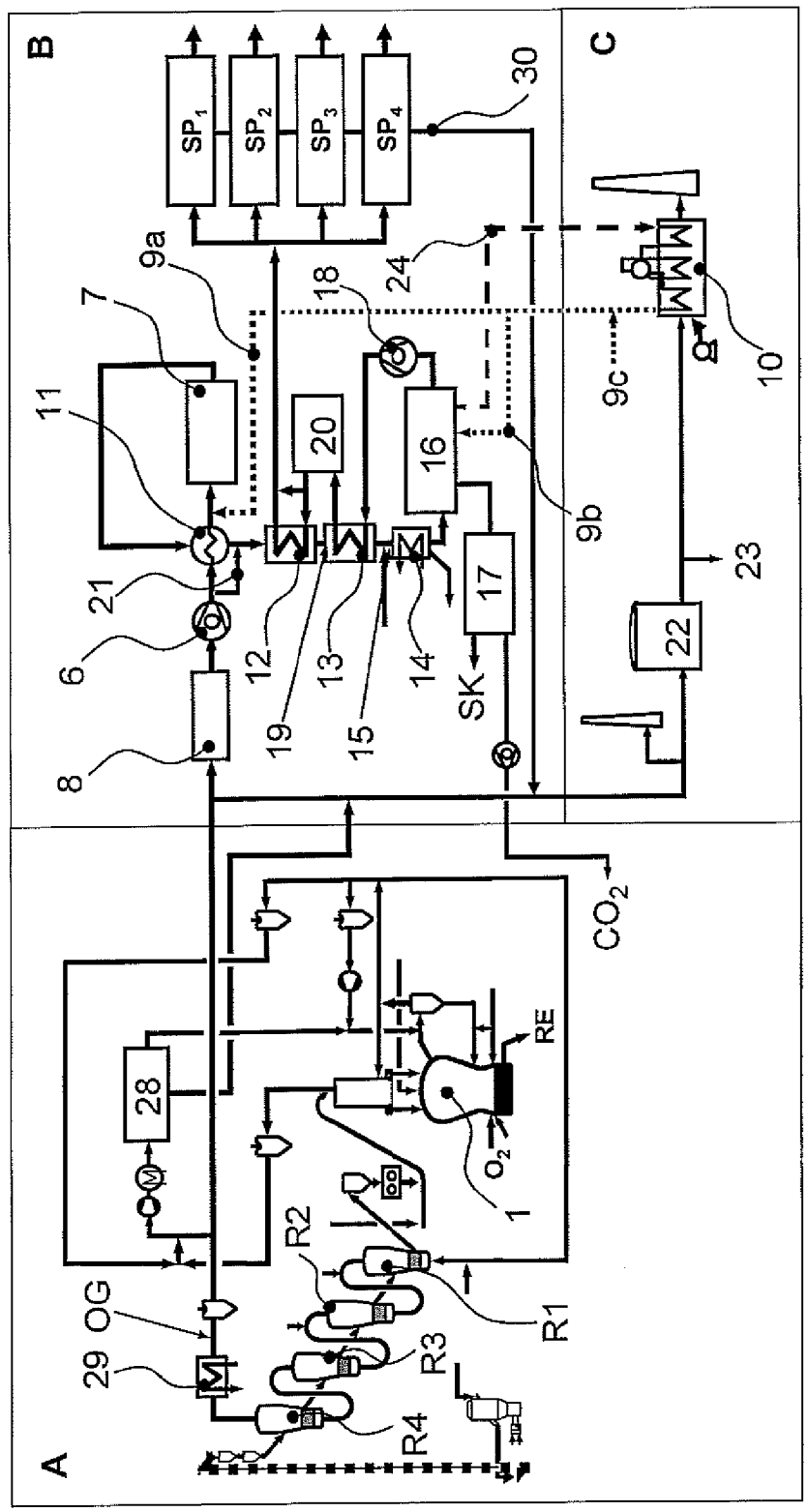
FIG. 2: diagram of the method according to various embodiments based on a melt-reduction plant of the "FINE®" type.

FIG. 2 shows a plant similar to that of FIG. 1, the plant part A being formed by a FINEX® melt-reduction plant. The reduction gas formed in the melt-down gasifier is conducted through the fluidized bed reactors R1, R2, R3 and R4 and in this case flows opposite to the direction of flow of the fine ore which is reduced in the fluidized bed reactors R1, R2, R3 and R4 and is then melted in the melt-down gasifier 1. The reduction gas is drawn off as offgas OG at the fluidized bed reactor R4, is cooled in a heat exchanger 29 and, after dedusting, is made available as export gas. The tail gas from a CO₂ removal plant 28, such as, for example, a pressure stress adsorption plant (PSA or VPSA plant), can be delivered together with export gas to the gasholder 22 and used for water vapor generation in the steam generator 10.

Figure 3:
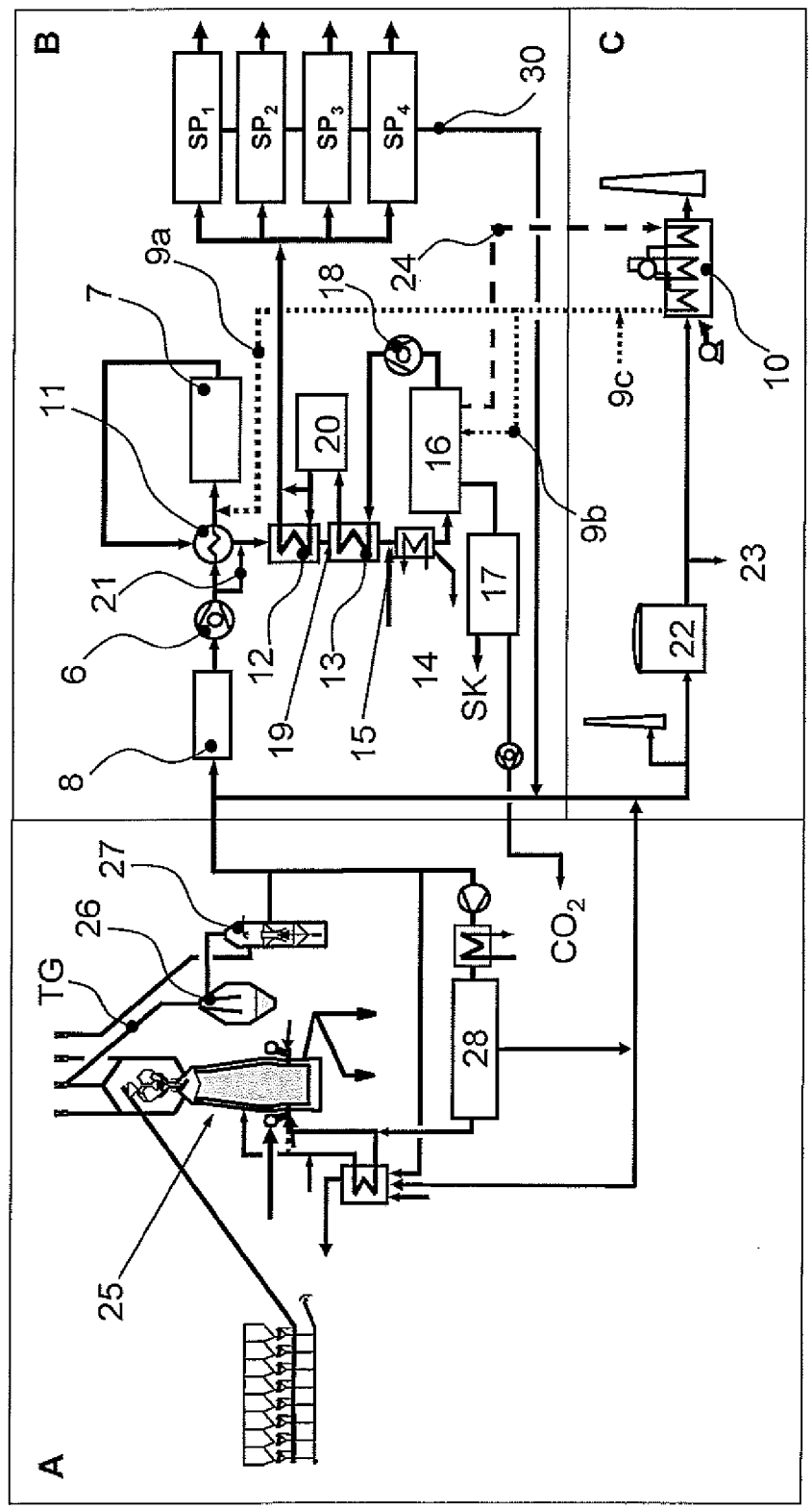
FIG. 3: diagram of the method according to various embodiments based on a blast furnace.

FIG. 3 shows a basically identical plant, the plant part A being formed by a blast furnace with connected supply assemblies. The top gas from the blast furnace 25 is first dedusted in a dry dedusting 26, if appropriate is subsequently further purified in a wet dedusting 27 and is made available asexport gas for the plant part B or C. In addition, the tail gas from a CO₂ removal plant 28 may likewise be delivered together with export gas to the gasholder 22 and used for water vapor generation in the steam generator 10.

LIST OF REFERENCE SYMBOLS

1 Melt-down gasifier
2 Reduction assembly
3 Dry dedusting
4 Wet dedusting
5 Waste heat recovery
6 Compressor
7 Transformation reactor
8 Tar removal device
9 Steam line
10 Steam generator
11 Heat exchanger
12 Heat exchanger
13 Preheating
14 Water cooler
15 Waste heat steam generator
16 Separation device
17 Desulfurization stage
18 Compressor
19 Crude gas line
20 Fine desulfurization stage
21 Bypass line
22 Gasholder
23 Discharge line
24 Condensate line
25 Blast furnace
26 Dry dedusting
27 Wet dedusting
28 CO₂ removal plant
29 Heat exchanger
30 Scavenging gas line

What is claimed is:

1. A method for generating a gas containing hydrogen and carbon monoxide, as a raw material for chemical utilization in synthesis processes based on export gas from a metallurgical process, the method comprising:
    adding at least one of water and water vapor to the metallurgical process thereby affecting the quantity ratio of H₂ to CO, in the export gas;
    obtaining the export gas from top gas from a blast furnace or a reduction shaft or from offgas from a fluidized bed reactor or from excess gas from a melt-down gasifier or from mixtures of these gases;
    subjecting at least part of the export gas to CO conversion in a transformation reactor with the addition of water vapor from a steam generator;
    using the converted at least part of the export gas as a crude synthesis gas with a defined quantity ratio of H₂ to CO, in a subsequent synthesis process;
    storing a further part of the export gas in a gasholder for the purpose of compensating fluctuations in at least one of quantity and in calorific value in the export gas; and
    generating the water vapor in the steam generator by means of the combustion of the at least further part of the export gas.

2. The method according to claim 1, wherein the metallurgical process is a melt-reduction process which is operated by means of a blast furnace or by means of a melt-down gasifier which works in conjunction with at least one reduction assembly, which can be a reduction shaft or a fluidized bed reactor, iron oxide-containing raw materials wherein the raw materials can be iron ores, pellets or sinter, and aggregates being reduced, so as to form a reduction gas, and subsequently being melted into liquid pig iron.

3. The method according to claim 1, wherein the water vapor is generated in the steam generator by means of at least one of the combustion of at least a further part of the export gas and by using waste heat from at least one of the metallurgical process, from CO conversion, and from the synthesis processes.

4. The method according to claim 1, wherein at least one of top gas and offgas is at least one of dedusted, wherein dedusting can be performed dry, and purified by means of wet dedusting, if appropriate cooled by means of a waste heat steam generator or a heat exchanger and made available as export gas.

5. The method according to claim 1, wherein the export gas, before it is fed into the transformation reactor or after it has been discharged from the transformation reactor, is compressed by means of a compressor, if appropriate after a separation of polyaromatic hydrocarbons from the export gas.

6. The method according to claim 1, wherein the CO conversion takes place, if appropriate after a heating of the export gas, wherein the heating can be performed at 300-450° C.

7. The method according to claim 1, wherein the crude synthesis gas is cooled by means of at least one of: by one or more heat exchangers operated as a preheating assembly, by means of a water cooler, and by means of a waste heat steam generator, in order to set the temperature.

8. The method according to claim 1, wherein the crude synthesis gas is first cooled and is then delivered to a separation process, wherein the separation process can be an a physical absorption process, a chemical absorption process, or a physical/chemical absorption process, in which sulfur and CO₂ are at least partially or largely completely, separated from the crude synthesis gas.

9. The method according to claim 8, wherein the crude synthesis gas treated in the separation process is heated, wherein the crude synthesis gas can be heated to a temperature of 200 to 400° C. and is desulfurized in a fine desulfurization stage, wherein the desulfurization stage may use zinc oxide or activated charcoal.

10. The method according to claim 7, wherein the waste heat occurring during the cooling of the crude synthesis gas in the heat exchanger is used for heating the crude synthesis gas treated in the separation process.

11. The method according to claim 7, wherein the water vapor occurring during cooling in the waste heat steam generator is delivered to the transformation reactor for use in CO conversion.

12. The method according to claim 1, wherein the crude synthesis gas treated, in particular in the separation process, is heated to a temperature of 200 to 450° C. by means of a heat exchanger.

13. The method according to claim 9, wherein the crude synthesis gas is compressed by means of a compressor, if appropriate before at least one of the further fine desulfurization stage and the synthesis process.

14. The method according to claim 8, wherein the separated sulfur is separated from the separated $CO_2$ in a sulfur regeneration device, the remaining $CO_2$ being used in the metallurgical process instead of nitrogen, wherein the $CO_2$ can be used for gas barriers with respect to the atmosphere.

15. The method according to claim 1, wherein part of the export gas is locked out for use as fuel gas in other heating devices.

16. The method according to claim 1, wherein at least one of the quantity ratio of $H_2$ to CO, the pressure, and the temperature of the crude synthesis gas is set as a function of the synthesis process in which the crude synthesis gas is processed.

17. The method according to claim 1, wherein at least part of the water vapor formed in the steam generator is delivered as an energy carrier to the separation process, a theniial expulsion of the $CO_2$ from the absorption liquid used in the separation process taking place.

18. The method according to claim 1, wherein tail gas from a $CO_2$ removal device of the metallurgical process is mixed with the further part of the export gas and is burnt in the steam generator.

19. The method according to claim 1, wherein scavenging gas from the synthesis process is mixed with the further part of the export gas and is burnt in the steam generator.

20. The method according to claim 1, wherein waste heat from the metallurgical process is used for the production of water vapor, and the water vapor in this case generated is delivered to at least one of the transformation reactor and to the separation process.

21. The method according to claim 1, wherein partially oxidized hydrocarbons, wherein the partially oxidized hydrocarbons can be natural gas, asphalt, coal or naphtha, are used in addition to the export gas.

* * * * *